US008856791B2

(12) United States Patent
Munaga et al.

(10) Patent No.: US 8,856,791 B2
(45) Date of Patent: Oct. 7, 2014

(54) METHOD AND SYSTEM FOR OPERATING IN HARD REAL TIME

(75) Inventors: Satya Munaga, Nieuwrode (BE); Francky Catthoor, Temse (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 1096 days.

(21) Appl. No.: 12/692,391

(22) Filed: Jan. 22, 2010

(65) Prior Publication Data

US 2010/0191349 A1 Jul. 29, 2010

Related U.S. Application Data

(60) Provisional application No. 61/147,045, filed on Jan. 23, 2009.

(51) Int. Cl.
*G06F 9/46* (2006.01)
*G06F 9/48* (2006.01)

(52) U.S. Cl.
CPC .................................. *G06F 9/4843* (2013.01)
USPC ...................................................... 718/100

(58) Field of Classification Search
None
See application file for complete search history.

(56) References Cited

U.S. PATENT DOCUMENTS

| 7,234,126 | B2 | 6/2007 | Catthoor et al. |
| 7,449,920 | B2 | 11/2008 | Papanikolaou et al. |
| 2005/0152280 | A1 | 7/2005 | Pollin et al. |
| 2005/0235232 | A1 | 10/2005 | Papanikolaou et al. |
| 2006/0114836 | A1 | 6/2006 | Pollin et al. |
| 2006/0253204 | A1 | 11/2006 | Papanikolaou et al. |
| 2007/0268931 | A1* | 11/2007 | Shaikli .......................... 370/468 |
| 2010/0122105 | A1* | 5/2010 | Arslan et al. .................. 713/500 |

FOREIGN PATENT DOCUMENTS

| WO | WO 00/50991 | 8/2000 |
| WO | WO 02/054237 A2 | 7/2002 |

OTHER PUBLICATIONS

WO 00/50991, Method and apparatus for scheduling program code in a computer system; Aug. 31, 2000.*
System-Scenario-Based Design of Dynamic Embedded Systems (Jun. 2008); ESR-2007-06 Sep. 30, 2007, revised Jun. 23, 2008; ISSN 1574-9517.*
M. Bekooij et al., "Predictable embedded multiprocessor system design," in in Proc. SCOPES. Springer, 2004.
P.A.N. Bosman, "Learning, anticipation and time-deception in evolutionary online dynamic optimization," in CECCO, 2005.
A.A. Jalali and V. Nadimi, "A survey on robust model predictive control from 1999-2006," Computational Intelligence for Modelling, Control and Automation, International Conference on, vol. 0, p. 207, 2006.
A. Andrei et al., "Quasi-static voltage scaling for energy minimization with time constraints," in Proceedings of the Design, Automation and Test in Europe Conference and Exhibition (DATE), 2005.

(Continued)

*Primary Examiner* — Emerson Puente
*Assistant Examiner* — Dong Kim
(74) *Attorney, Agent, or Firm* — Knobbe Martens Olson & Bear LLP

(57) ABSTRACT

A method for managing the operation of an electronic system by taking into account various cost constraints of the system is disclosed. In one aspect, the method includes selecting a working mode for a plurality of tasks in a pro-active way using predictive control mechanism while guaranteeing hard real time constraints. The system is operated at the selected working mode for the corresponding tasks.

19 Claims, 8 Drawing Sheets

(56) References Cited

OTHER PUBLICATIONS

H. Aydin, R. Melhem, D. Moss, and P. Meja-Alvarez, "Power-aware scheduling for periodic real-time tasks," IEEE Transactions on Computers, vol. 53, No. 5, pp. 584-600, 2004.

B. Mochocki et. Al., "Transition-overhead-aware voltage scheduling for fixed-priority real-time systems," ACM TODAES, vol. 12, No. 2, 2007.

S.V. Gheorghita et al., "System scenario based design of dynamic embedded systems," ACM Transaction on Design Automation of Electronic Systems (ToDAES), 2008.

"Gecode: Generic constraint development environment.", http://www.gecode.org/, Retrieved on Apr. 29, 2010.

A. Maxiaguine et al., "Dvs for buffer-constrained architectures with predictable qos-energy tradeoffs," in CODES+ISSS, Jersey City, New Jersey, USA, Sep. 19-21, 2005.

P.Pillai and K.G. Shin, "Real-time dynamic voltage scaling for lowpower embedded operating systems," in SOSP, 2001: Proceedings of the eighteenth ACM symposium on Operating systems principles.

Lap-Fai Leung et al., "Exploiting dynamic workload variation in low energy preemptive task scheduling," in Proceedings of the Design, Automation and Test in Europe Conference and Exhibition (DATE), 2005.

Extended European Search Report for European Patent Application No. 10151485.9 dated Jul. 17, 2012 by European Patent Office.

* cited by examiner

FIG. 1A
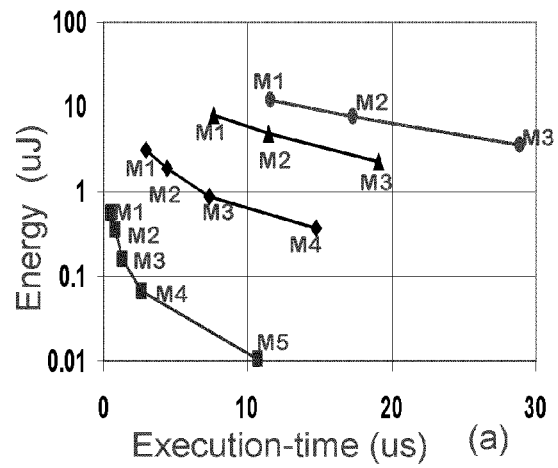
FIG. 1B
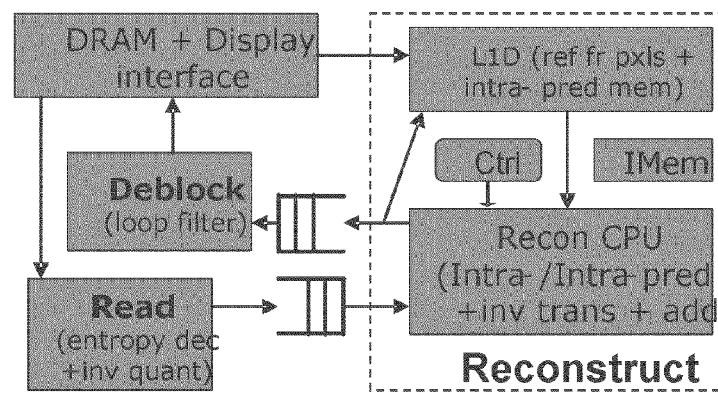
FIG. 1C
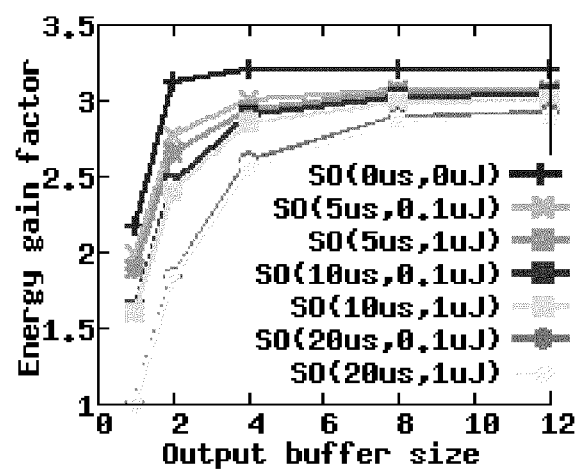
Figure 1

Table 1

| ST# | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|---|
| DTWC | 5787 | 5787 | 5787 | 5787 | 5787 | 5787 | 5787 | 5787 | 5787 | 5787 | 5787 | 5787 | 5787 | 5787 | 5787 | 5787 | 5787 | 5787 | 5787 | 5787 | 5787 | 5787 |
| AEC | 1802 | 633 | 2056 | 3484 | 4838 | 2614 | 1683 | 2581 | 1486 | 3736 | 2459 | 1823 | 1243 | 1395 | 751 | 751 | 751 | 751 | 751 | 751 | 751 | 751 |
| ref.UB | 2291 | 2080 | 5069 | 4556 | 5069 | 5069 | 2660 | 4489 | 1487 | 5787 | 1872 | 1292 | 4489 | 2291 | 2291 | 2291 | 2291 | 2291 | 2291 | 2291 | 2291 | 2291 |

METHOD AND SYSTEM FOR OPERATING IN HARD REAL TIME

CROSS REFERENCE TO RELATED APPLICATIONS

This application claims priority under 35 U.S.C. §119(e) to U.S. provisional patent application 61/147,045 filed on Jan. 23, 2009, which application is hereby incorporated by reference in its entirety.

BACKGROUND OF THE INVENTION

1. Field of the Invention

The present invention is related to a method for operating an electronic processor based system, more in particular a non-linear dynamic system with hard constraints, and devices suited therefore.

2. Description of the Related Technology

Dynamic systems can be designed to be adaptive with the help of "knobs" which offer run-time trade-offs between system metrics of interest, such as performance, power consumption, and quality-of-service. These knobs need to be regularly controlled/tuned such that the system cost (e.g. energy consumption, revenue loss due to poor capacity) is minimized while meeting all the hard constraints, such as deadlines, assured minimum quality, and guaranteed lifetime.

Such an optimum control problem is further complicated by the uncertainties, the relevant system dynamics (e.g. computation requirements of tasks, bandwidth requirements of connected users, device usage/workload, etc) which are not completely known even at the time of run-time knob decision making but have significant impact on the optimality and feasibility/stability of the system.

SUMMARY OF CERTAIN INVENTIVE ASPECTS

Certain inventive aspects relate to methods or devices to manage the operation of a hard real time system by exploiting task information determined by a predictor, as well as to provide the system with a controller.

One inventive aspect relates to control of electronic systems with a processor where the constraints, not just the costs, are dependent on uncertainties, i.e., a wrong decision leads to unacceptable constraint violation. Thus bounds on these uncertainties are and important part of the system and typically they are computed purely at design-time. The switching overheads of changing knob settings also need to be explicitly accounted for (these can be seen as controllable uncertainties). Such systems exhibit what is called time-linkage, i.e., decisions of the present have a significant impact on the future performance. Achieving optimal constrained control of such adaptive systems with low overhead is an advantage of one inventive aspect.

One inventive aspect relates to a method of managing the operation of a hard real time electronic system, using a processor, by exploiting task information determined by a predictor. The method comprises when a new task is received by the processor, then for a set of tasks including a new task, select a current working mode from a set of working modes, for the set of tasks for executing the tasks based on upper bound information of the tasks and a condition for revising a working mode of the system. The method further comprises run a dynamical procedure that outputs an improved working mode for the tasks from the set of working modes and one or more conditions for revising the working mode, depending on overhead and constraints information of at least one completed task and at least one to be completed task determined by the predictor. The method further comprises implement the current working mode or the improved working mode of tasks on the system depending on the one or more conditions for revising the working mode. This method improves utilization at run time.

In the method an upper bound of the tasks can be determined by (a) loading the upper bound information of the tasks available at design time and (b) determining a refined upper bound of the tasks using a model developed at design time using constraints information of the tasks determined by the predictor. The refinement of the upper bound allows a more accurate planning of resources.

In an embodiment, the dynamical procedure that outputs the improved working mode for the tasks is performed based on an amount of slack of the tasks.

This can allow better utilization of the slack and hence of the resources.

The amount of slack of the tasks can be determined depending on (a) slack usage of future tasks by assigning more slack to a task in anticipation of an equivalent amount of slack being released by future tasks, and (b) slack usage of the past and finished task by assigning the released slack to future tasks. This provides a more optimal use of slack.

Selection of a working mode can be done at run-time using an energy/execution-time look-up table of the electronic system determined at design-time.

A look-up table is a convenient and simple tool and therefore makes the implementation easy. The look-up table preferably contains an extreme working mode which can be selected at run-time depending on timing, thermal and reliability constraints of the system using pre-defined models at design time. The extreme working mode can be used to relieve problems in the operation of the system when constraints might be breached.

The overhead and constraints information of tasks can be determined by using optimized and adaptive application-, context-, and content-specific predictors. Also dynamically state-enhanced procedures can be used at different time instances which are selected based on a quality-complexity trade-off.

One inventive aspect relates to a non-transitory computer-readable storage medium with an executable program stored thereon, wherein the program instructs the operation of a hard real time system by exploiting task information determined by a predictor, the instructions being adapted so as to (a) when a new task is received by the processor, then for a set of tasks including a new task, select a current working mode from a set of working modes, for the set of tasks for executing the tasks based on upper bound information of the tasks and a condition for revising a working mode of the system, (b) run a dynamical procedure that outputs an improved working mode for the tasks from the set of working modes and one or more conditions for revising the working mode, depending on overhead and constraints information of at least one completed task and at least one to be completed task determined by the predictor, and (c) implement the current working mode or the improved working mode of tasks on the system depending on the one or more conditions for revising the working mode.

One inventive aspect relates to a hard real time system having a processor and a controller of the operation of the system by exploiting task information determined by a predictor. The system comprises the controller being adapted to select a current working mode such that when a new task is received by the processor, then for a set of tasks including a new task, the controller selects the current working mode from a set of working modes, for the set of tasks for executing the tasks based on upper bound information of the tasks and a condition for revising a working mode of the system. The system further comprises the controller being adapted to run a dynamical procedure that outputs an improved working mode for the tasks from the set of working modes and one or more conditions for revising the working mode, depending on overhead and constraints information of at least one completed task and at least one to be completed task determined by the predictor. The system further comprises the controller being adapted to implement the current working mode or the improved working mode of tasks on the system depending on the one or more conditions for revising the working mode.

One inventive aspect relates to a controller for controlling the operation of a hard real time system by exploiting task information determined by a predictor. The system comprises the controller being adapted to select a current working mode such that when a new task is received by the processor, then for a set of tasks including a new task, the controller selects the current working mode from a set of working modes, for the set of tasks for executing the tasks based on upper bound information of the tasks and a condition for revising a working mode of the system. The controller is adapted to run a dynamical procedure that outputs an improved working mode for the tasks from the set of working modes and one or more conditions for revising the working mode, depending on overhead and constraints information of at least one completed task and at least one to be completed task determined by the predictor. The controller is adapted to implement the current working mode or the improved working mode of tasks on the system depending on the one or more conditions for revising the working mode.

The controller can be adapted to carry out the re-optimization procedure that outputs the improved working mode or modes for the tasks, based on the amount of slack of the tasks.

The amount of slack of the tasks can be determined depending on (a) slack usage of future tasks by assigning more slack to a task in anticipation of the equivalent amount of slack being released by future tasks, and (b) slack usage of the past and finished task by assigning the released slack to future tasks.

The controller can be adapted to select a working mode at run-time using an energy/execution-time look-up table of the electronic system determined at design-time. The look-up table is preferably stored in memory that is accessible by the controller. Preferably the look-up table contains an extreme working mode; and the controller is adapted to select at run-time the extreme working mode depending on timing, thermal and reliability constraints of the system using pre-defined models at design time.

The controller can be adapted to use dynamically state-enhanced procedures at different time instances which are selected based on a quality-complexity trade-off.

BRIEF DESCRIPTION OF THE DRAWINGS

FIG. 1 illustrates (a) Discrete and nonlinear E-T trade-offs of Reconstruct sub-task for few different macroblocks (b) AVC design with the Reconstruct module under the study (c) Potential (Oracle SW10) energy savings (w.r.t. no knob tuning case) for different switching time and energy overheads as a function of output buffer size;

Figure 2:
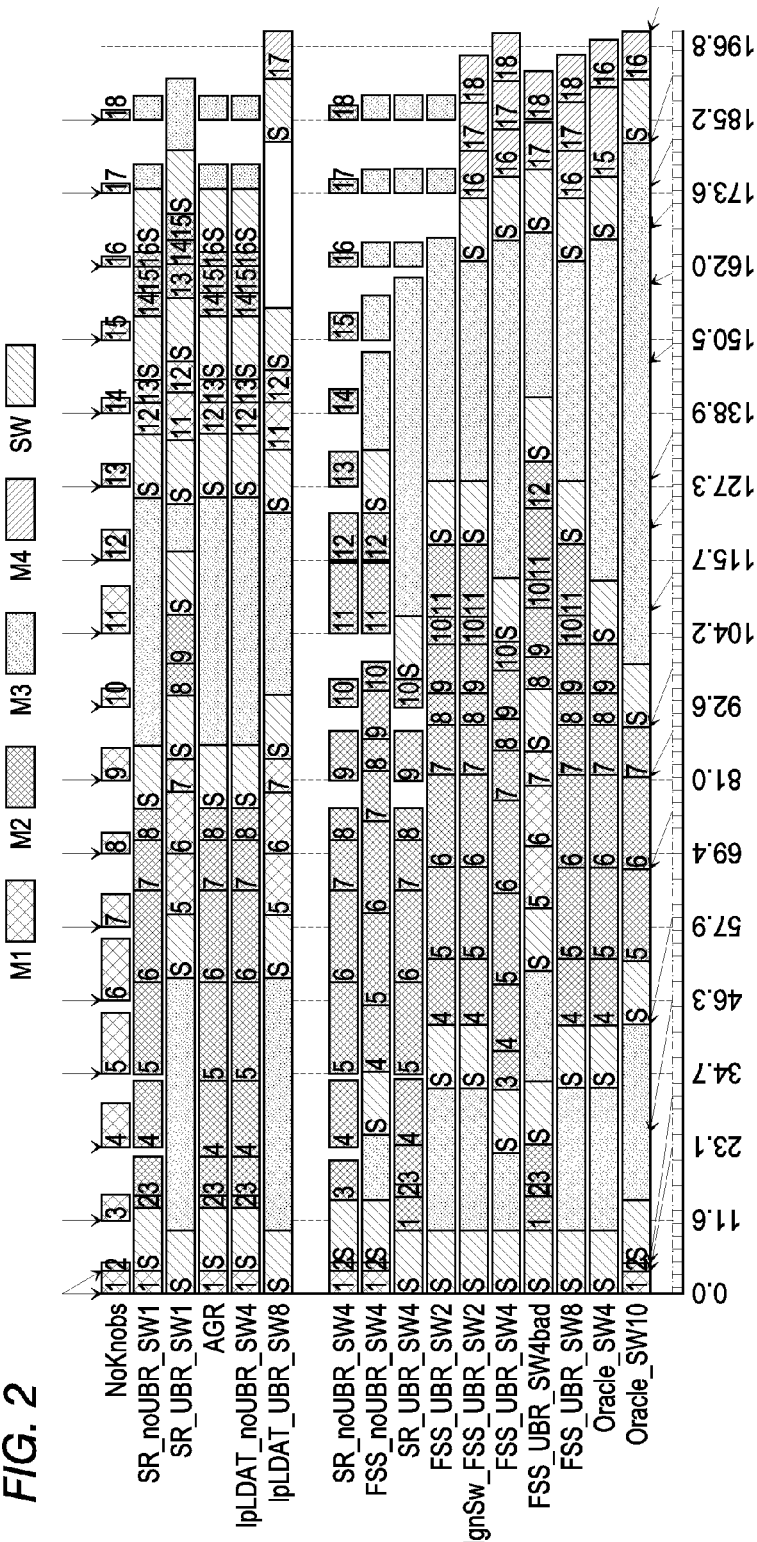
FIG. 2 is a diagram showing illustrative schedules using few new techniques derived using the proposed framework; schedules using existing methods are shown at the top to exemplify the differences (x-axis: time in usec)

Table 1 shows actual execution cycles and refined upper bounds of sub-tasks of the scheduling illustration.

DETAILED DESCRIPTION OF CERTAIN ILLUSTRATIVE EMBODIMENTS

It is an aspect of the invention to provide methods or devices to manage the operation of a hard real time system by exploiting task information determined by a predictor as well as to provide the system with a controller.

A first aspect is to combine scenario-based design-time run-time split design methods based on trade-offs such as energy-performance trade-offs with look-ahead and/or predictive control methods at run-time. A trade-off relates to tuples involving a resource and a constraint whereby when improving either a resource or a constraint, the other of the tuple, a constraint or a resource respectively, does not necessarily improve. A trade-off leads therefore to a selection with pros and cons. An example is meeting a hard constraint such as a time to complete a task by using a large amount of power.

The goal of using predictive control methods at run-time is two fold: (i) to refine the upper bounds and (ii) to estimate the expected values of dynamic aspects of the system.

An upper bound relates to the maximum value that a particular operation may assume, e.g. the maximum time that an operation or a task may take to complete, or the maximum resources an operation or a task may consume.

The refinement of upper bounds of tasks is one aspect of the invention. Upper bound information is used to select a working mode for the system for the tasks. The upper bound information is available at design time and is further refined by the system when new tasks are received using a model developed at design taking into account overhead and constraints information of tasks at run-time. Overhead and constraints information of tasks are determined by using optimized and adaptive application-, context-, and content-specific predictors for better accuracy at low overhead.

Overhead is considered to be the extra energy and time that is needed to switch between different working modes of the processor. For example, the extra energy and time needed to change the voltage and frequency of a processor is considered to be overhead. Related to knob settings; it is the extra energy or time needed to change the knob settings of the system. In general, the overhead is considered to be the extra energy or time needed to obtain a particular goal, in this case it is the time and energy needed to switch between different working modes of the processor.

Optimized and adaptive application-, context-, and content-specific predictors for better accuracy at low overhead means the use of specific predictors which are designed and optimized for specific applications. For example, a predictor which is exploiting the meta-data available in the content headers and the correlations of moving objects across frames could be used in a video application. This predictor will be able to make more accurate predictions, therefore consuming less time and energy than a generic predictor which is not designed or optimized specifically for this task or purpose.

Figure 4:
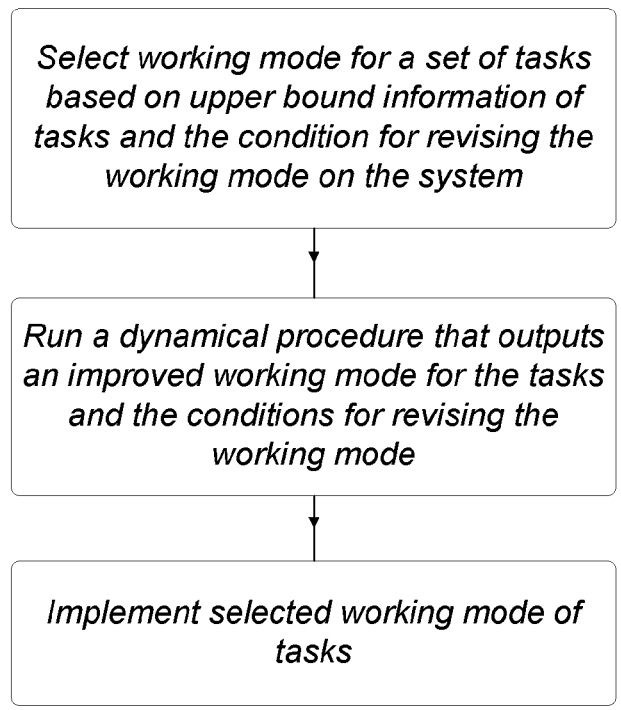
FIG. 4 is a diagram illustrating a method of managing the operation of a hard real time system.
Figure 5:
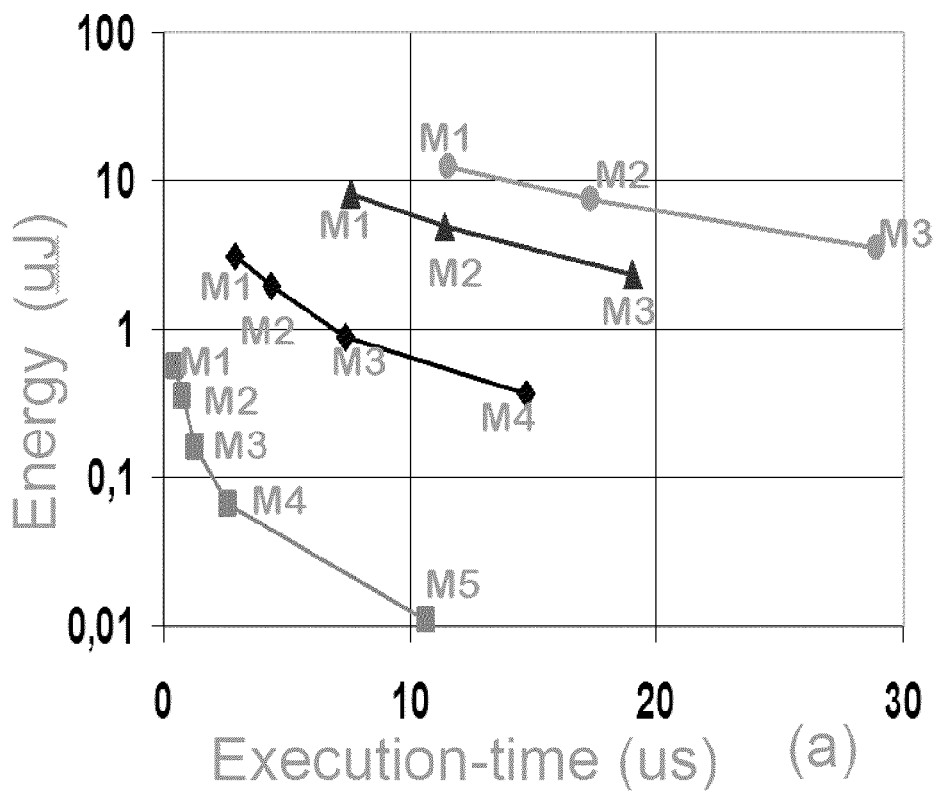
FIG. 5 is a diagram illustrating the selection of a working mode is done at run-time using an energy/execution-time look-up table of the electronic system determined at design-time.

With reference to FIGS. 4 and 5, another aspect relates to scenario-based design-time run-time split design methods based on energy-performance trade-offs but specially adapted for control of dynamical nonlinear systems with hard constraints, e.g., a hard real time constraint, real-time throughput, strict latency, minimal life-time (reliability), maximal power (for heat), maximal energy budget (battery life). It is another aspect to combine the scenario-based design-time run-time split design methods based on trade-offs such as energy-performance trade-offs with one or more additional control options, which are sufficient to guarantee the hard real-time constraint or constraints in any case (but of course taking into account the possibility of a high energy penalty), and in particular, to use this again in combination with predictive control methods.

The selection of a new working mode for a set of tasks depends on one or more conditions which are determined by a proactive controller of the system. The pro-active controller decides if a new working mode for a set of tasks should be determined for a set of tasks depending on task information delivered by a predictor. Furthermore, the pro-active controller runs a dynamical re-optimization procedure that outputs an improved working mode for the tasks and one or more conditions for revising the working mode, depending on overhead and constraints information of at least one completed task and at least one to be completed task determined by the predictor. In this case, overhead of optimization can be considered as the excess of time or energy required to alter or calculate working modes for tasks.

The procedure is dynamical because a customized dynamic procedure is used to reduce the overall time and energy for solving the optimization problem at run-time. The complex optimizations are solved using a dynamic horizon. By switching between methods of different horizon complexities at the right moment in time, the average run-time overhead of the optimization can significantly be reduced without noticeable sub-optimality. To increase switching opportunities and avoid unnecessary switching oscillations and greedy slack usage; the optimization horizon is increased. The selection between the different methods of different horizon complexity is decided based on a quality-complexity trade-off.

As the optimization procedure involves uncertainties of the system, the working mode of the previously considered but yet to be executed tasks are revisited as some of the uncertainties get resolved. To minimize the run-time overhead, a dynamic receding horizon principle is used only when the resolved uncertainties makes it essential or enable energy gains. The information from the previous optimization is maximally re-used as the changes are often incremental. The optimization procedure gives the working mode list as output but also the conditions for revising the decisions and indication to the methods for doing it effectively along with the data needed for them. This dynamical procedure re-optimization procedure outputs an improved, e.g. an optimized working mode list for the tasks based on the amount of slack of the tasks.

By using the dynamic receding horizon principle, revision of decisions can be done as uncertainties get resolved at run-time. Given this, slack assignment can be performed dynamically (e.g. more slack can be consumed in the first place than is normally done). More slack can be consumed in anticipation of the equivalent amount of slack being released by the time it is needed. Preferably, a scheduler always ensures that a feasible schedule exists even when the expected slack is not released. The scheduler also identifies the right amount of slack required by the current task and extracts it from the right place, to limit the overhead. The scheduler takes controlled risk of allocating less time budget to a task than the task might actually utilize in worst-case while still guaranteeing the deadlines of both current and future tasks.

Figure 6:
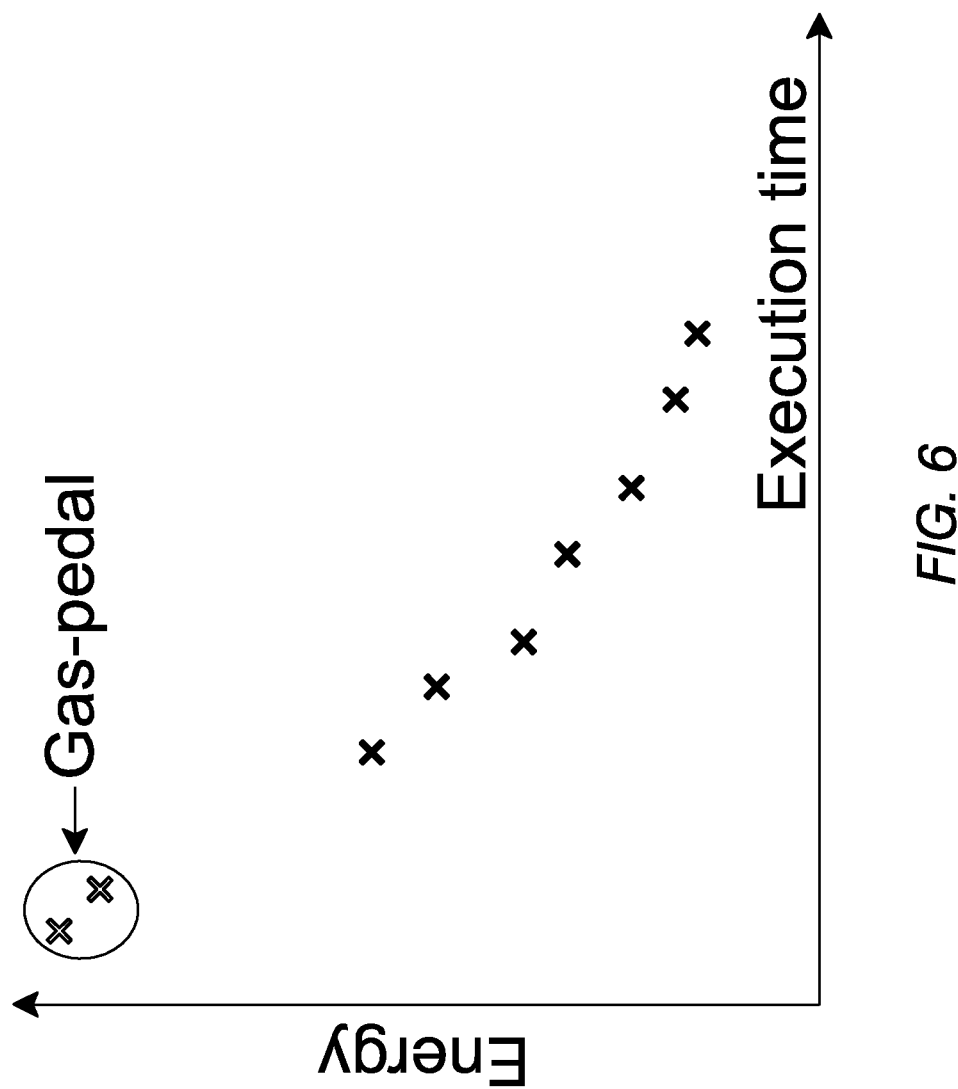
FIG. 6 is a diagram illustrating the energy/execution-time look-up table contains an extreme working mode which can be selected at run-time depending on timing, thermal and reliability constraints of the system using pre-defined models at design time.

With reference to FIG. 6, another aspect is the presence of an extreme working mode (gas pedal) for a plurality of tasks which can be selected at run-time depending on constraints of the system, e.g. timing, thermal and reliability constraints of the system using pre-defined models at design time. Lifetime reliability of a system-in-package is a complex function of fabrication process variability, system activity and thermal environment. The extreme working mode is an extreme Pareto-optimal operational mode of the system in which one of the system metrics is much better than the other operating modes. This mode enhances the opportunities of consuming more slack of tasks and thus more gains. The pro-active controller can make use of this extreme working mode judiciously, using the extreme working model only, for example, in a crisis (e.g. when there is risk of a potential constraint violation) situation (either naturally occurring in under-designed systems or artificially created due to over slack consummation in the past) while simultaneously ensuring that such usage will not violate any other constraints.

Embodiments

In an embodiment of the present invention, the H.264/AVC 720p video decoder design is considered and it is composed of 3 IP modules as shown in FIG. 1(b). The Reconstruct module, IP under the focus, depending upon macroblock (MB) properties (~20 B) implements intra/inter frame prediction, motion compensation, and inverse transformations to finally reconstruct the macroblock (~400 B) and sends to the Deblock module. The Deblock module sends the macroblock data directly to a display controller in case of B-frames (~80% of total) to avoid redundant accesses to external memory such as a DRAM. The reference frames (each of ~1.32 MB) are stored in the memory such as a DRAM and sent to the display at an appropriate time. The Reconstruct module pre-fetches the required reference pixels into its local memory before starting to process the macroblock to avoid memory stalls during the processing. It comprises for example a clustered 8-issue VLIW processor with 32-bit SIMD datapath, similar to TI C64+, and the code is preferably heavily optimized to best utilize the instruction set architecture. The number of execution cycles (EC) required to perform a Reconstruct task varies across different macroblocks ranging from 250 to 5787. The theoretical worst-case macroblock needs up to 12000 but profiling on a large number of real video sequences shows that highest values are just below 5787. All the three modules (Reconstruct module, Deblock module and Read module) run in macroblock-level pipeline and thus to perform Reconstruct on an entire frame (the task) there is approximately 41.67 msec available as a constraint, i.e., 11.57 usec for one macroblock (sub-task), while decoding a 720p sequence at 24 fps. Thus, the best static design choice is to run the Reconstruct module at a speed, e.g. 500 Mhz (M1, the highest speed mode) always which ensures all constraints (discussed below) even under the worst-case situations. It is equipped with a "knob" similar to module-level dynamic voltage and frequency scaling which offers discrete nonlinear E-T (energy/timing) trade-off as shown in FIG. 1($a$). The knob switching overhead, which can range, for example from 2 μs to 20 μs and 0.1 μJ to 10 μJ depending on the specific circuit and technology implementation choices, is modeled to be the same across any pair of knob settings for brevity.

FIG. 1($c$) shows the upper bounds on the possible gains, by optimal selection of these knob settings using an Oracle (i.e. a theoretical best case solution), compared to the static design time (DT) solution, as a function of switching overhead and output buffer size, under the strict timing constraints discussed below. The higher the output buffer size the more the opportunities for optimal sub task (ST) stretching but the gains quickly saturate. This indicates that large savings are potentially feasible with very small buffer sizes; this is contrary to much of the published work which assumes very large buffers, sometimes even full frame size buffers, to soften the timing constraints and/or to simplify the knob tuning techniques. As memory costs (e.g. in area, time, and energy) more than logic, knob tuning techniques are presented in one embodiment which achieve near optimal gains with smaller output buffer size. Also softening the module-level constraints may require costly system-level fixes such as frame buffering to meet system-level quality requirements on display rate and/or jitter.

The purpose of the pro-active controller in this embodiment of the invention is to select the right knob setting for each macroblock such that the overall energy consumption including the switching energy overhead and leakage energy is minimized while strictly respecting all the hard timing and resource constraints. The timing constraints include: (i) timing deadlines: one macroblock must be available at every macroblock period (11.57 μsec, in this case) for guaranteed consumption by the Deblock module (and similar constraints for the Read and Deblock modules ensure the predictable and correct operation of the whole system) (ii) output buffer overflow: processing can not start without having an entry in output buffer available (iii) input data availability. Of the above, (ii) and (iii) are the easiest—the processor can be stalled until an entry in an output buffer is available and the input data is ready, i.e., corrective action can be taken even at the last moment. On the other hand, (i) is the most difficult constraint which is referred to as an uncertainty-dependent conflicting constraint—it is linked with the knob decision, conflicts with the cost objective, depends on the unknowns (macroblocks' ready times and actual execution cycles), and corrective action is not possible at the very last moment. Trying to be too safe on this constraint leads to pessimism and this pushes to choose a knob that will result in higher energy consumption which will easily turn out to be suboptimal when the macroblock finishes earlier than its guaranteed upper bound. Using the released slack to elongate the following macroblocks (SR_noUBR_SW1) partly recovering the energy loss is not always feasible due to data/control/access dependencies. Also it is sub-optimal for one macroblock to consume either too much or too little slack due to a nonlinear E-T (Energy/Timing) relationship as shown in FIG. 1($a$). Thus utilizing the right amount of slack for subtask stretching at the right moment in time becomes important for an optimal solution. The right moment gets difficult to determine and very dynamic due to nonlinearities such as switching overhead, discrete knob settings, nonlinear E-T trade-off, nonidentical macroblocks, and uncertainties in the execution cycles and ready times of macroblocks. Thus, the controller needs to be proactive to evaluate the consequences of the current decisions on the future in order to perform holistically optimal slack management and knob decisions, in other words, to create a desirable history for the future by incorporating the future implications into the present.

Design Guidance Framework for Proactive Energy-performance Scaling

In the following, various features are described in an embodiment of the present invention, using customized proactive energy performance scaling (EPS) techniques which can be designed for the specific system at hand. The proactive energy performance scaling is modeled as an optimization problem, incorporating all the features and strategies described in this section, using constraint programming in Gecode[8].

For the illustration of the concepts, a set of subtasks with the properties are shown in Table 1—a small snippet of the Reconstruct module, as mentioned above, while decoding real video. The top rows of FIG. 2 show the scheduling of these subtasks using the existing techniques previously discussed. The bottom rows are the schedules generated by using different combinations of the proposed features of one embodiment. The arrows at the top and bottom show the release times and deadlines, respectively. The mode of the processor before time 0 is M1, the highest mode. The NoKnobs row shows the schedule without any knob tuning. The white spaces indicate the idle periods due to lack of ready subtasks and the 'S' rectangles indicate the time lost due to mode switching. SW# indicates the scheduling window size, i.e., number of subtasks considered together during the optimization. The counter intuitiveness is typical of nonlinear optimization in Oracle SW4/10.

A. Future Look-ahead for Pro-activeness

Existing fine-grain energy performance scaling techniques are reactive, i.e., optimize knob setting of one subtask at a time (SR_noUBR_SW1 row in FIG. 2). This implies, in addition to room for switching to a lower mode at the beginning, enough room for switching overhead needs to be left at the end of the subtask as the next subtask might require the default highest mode. This significantly limits the switching opportunities when the switching overheads are high (c.f.r. ST-1). Not only the overheads due to frequent switching but also the nonlinear E-T trade-offs make such greedy slack consumption sub-optimal (c.f.r. subtasks 12 & 13). To avoid the worst-case switching overhead assumptions the optimization horizon is increased, i.e., considering the knob decisions of current and future subtasks together. This increases switching opportunities and avoids unnecessary switching oscillations and greedy slack usage.

B. Dynamic Receding Horizon

As the run-time optimization involves uncertainties, it can be beneficial to revisit the knob decisions of the previously considered but yet to be executed subtasks as some of the uncertainties get resolved. This in systems theory is known as use of a receding horizon, which makes sense only when multiple subtasks are optimized together. As execution progresses, the actual execution cycles uncertainty is resolved and the resulting slack might enable more optimal knob decisions which were may be known but not possible before. 1pLDAT[6] uses re-optimization at the end of every job (100 μsec) to reclaim and redistribute the slack released and, to keep the overhead small, it considers jobs only till the latest common deadline. In contrast, in embodiments of the present invention subtasks are considered beyond a single deadline and reoptimization is performed dynamically and incrementally, i.e., only when the resolved uncertainties makes it essential or enable energy gains, so that the run-time overhead is small. The information from the previous optimization is maximally reused as the changes are often incremental. Thus the optimization procedure not only gives the mode list as output but also the conditions for revising the decisions and indication to the methods for doing it effectively along with the data needed for them.

SR_noUBR_SW4 bar in FIG. 2 shows the resulting schedule with optimization horizon 4 and a receding horizon of 1, i.e., re-optimization is performed after completion of every subtask. Note the less switching and suppression of higher mode M1 for subtasks 12 & 13, compared to SR_noUBR_SW1. When upper bounds are loose, naive future look-ahead even with receding horizon may lead to a poorer result (c.f.r. subtask 9 & 10) as the optimizer is deceived by the uncertainties due to its inability to realize that more slack will be available as execution progresses. To circumvent this it is needed to either tighten the upper bounds or steal the slack from the future time slots (see future slack stealing section below) or both. This is discussed below.

C. Dynamic Upper Bound Refinement

As the optimization should always respect certain hard constraints it should know the upper bounds on the dependent uncertainties, such as subtask execution cycles and ready times. The tighter these upper bounds the better the optimality due to increased determinism in the optimization problem. As design time upper bounds are very loose in highly dynamic systems (c.f.r. Table 1), dynamic upper bound refinement (UBR) is used in one embodiment. The idea is that more information about subtasks to be executed is known at run-time which can help refine the upper bounds. For refining upper bound execution cycles of subtasks the System Scenarios methodology is reused presented in [7] which exploits the correlations between a subtask's properties (or input data) and its execution on deterministic/predictable architectures (such as the one in this example). The method basically clusters frequent subtasks which require similar execution cycles into a few frequently activated scenarios and the rest that is rarer into a backup scenario. Then each scenario is characterized for its upper bound execution cycles either using sophisticated worst case execution time estimation tools or designer identified corner-case simulation, thanks to deterministic architecture. The upper bound execution cycles info of each scenario is stored in a small look-up table (LUT) which is addressed using a customized hash function, called scenario detector, which is developed along with the clustering process. Thus at run-time, given the subtask input data, its refined upper bound execution cycles can be calculated by evaluating a small function (typically few comparisons) and accessing a small LUT (e.g. less than 16 entries). The sub-scenarios concept of preparing scenario LUTs for smaller decomposed parts of subtasks and then combining them using a model (typically conditional summation) to compute the upper bounds of the entire subtask is quite handy both in terms of design-time complexity and run-time overhead.

In the case study, the look-ahead is restricted to the subtasks available in the input buffer (which does not mean all subtasks are ready)—this is not a bottleneck with larger input buffer size (one input buffer entry is ½0th of output buffer entry). Simple look-ahead into the input buffer gives the macroblock properties which are used as described above to compute upper bound execution cycles. Table 1 shows the refined upper bounds of a Reconstruct subtask computed at run-time using 3 LUTs each with less than 8 entries and appropriate detector functions with no more than 8 comparisons (it takes _25 simple operations to compute upper bound execution cycles of a macroblock). Resulting upper bounds are tighter but for some they are still loose—the more the number of scenarios the tighter the bounds but the higher the detection and table look-up overhead. SR_UBR_SW1/4 shows the schedules with the refined upper bounds and optimal receding horizon (as discussed before) with a scheduling window of 1 and 4 subtasks respectively. Note that the refined upper bounds enabled lower mode for ST-1 in both cases and subtasks 11-18 in SW4 case. SR_UBR_SW1 is very similar to the one used in [7]; due to its local view it results in costlier modes more often than it improves (c.f.r. subtasks 5-7).

D. Future Slack Stealing

Typical scheduling techniques are always conservative, i.e., assume upper bound execution cycles as the actual execution cycles (AEC) while performing the knob decisions. This ensures that timing deadlines are met without rescheduling even when all the subtasks optimized together turn out to be the worst-case. Thus the resulting modes are optimal for this rarely occurring case. When the upper bounds are not very tight, such techniques are unable to find opportunities for switching due to insufficient available slack. In the light of the receding horizon, i.e., the possibility to revise decisions as uncertainties get resolved, more slack can be consumed in the first place than normally would be done. This technique is called future slack stealing (FSS), as more slack is consumed only in anticipation of the equivalent amount of slack being released by the time it is needed. In other words, if the expected amount of slack is not released later, speculative slack consumption is clearly a sub-optimal decision and hence not performed by the traditional deterministic optimization. The scheduler always ensures that a feasible schedule exists even when the expected slack is not released. But the resulting schedule would incur an energy penalty that is higher than the expected increase in the gains.

Future slack stealing is a form of risk-taking and is the underlying concept of speculative speed reduction [5] and look-ahead dynamic voltage scaling [10]. Speculative speed reduction (AGR) of [5], [10] uses all future slack along with the already available slack to extend the current subtask at hand, which would be suboptimal more often than not. This was indicated in [5] and the authors proposed a scaling factor to control the aggressiveness. [6] recommends use of design time average execution cycles of tasks to compute a limiting mode for task stretching. Unfortunately none of these methods are suitable for highly dynamic systems. Therefore, estimates are used to guide the process of future slack stealing and its allocation/consumption in accordance with one embodiment. To model future slack stealing, energy performance scaling uses expected execution cycles (EEC) obtained using the predictor (see section E below) as extra input to the optimizer along with upper bound execution cycles and gives expected modes as the output. If the "actual execution cycles"<="expected execution cycles" for all subtasks, these expected modes can be used as is without any revision (the result is optimal when "actual execution cycles"="expected execution cycles" but may be sub-optimal when "actual execution cycles"<<"expected execution cycles" due to extra unconsidered slack) but may need to be revised if "actual execution cycles">"expected execution cycles". Energy performance scaling includes all constraints (such as non-overlapping start and end times) of DS but uses "expected execution cycles" instead of upper bound execution cycles for computing duration of subtasks. To ensure the schedule feasibility energy performance scaling includes an additional set of safety constraints: start time of any subtask is not stretched beyond LatestStart which ensures there is enough time, including room for switching overhead, to finish all the later subtasks using their highest modes before their deadlines even when the current and future subtasks need upper bound execution cycles.

E. Estimation/Prediction of Uncertainties

Optimal future slack stealing requires actual execution cycles of subtasks which is not known before hand. Real activity of subtasks is also needed for better estimation of subtask's energy consumption which are required in making the right knob decisions. In embodiments of the present invention, predicted values are used for all relevant uncertainties (AEC, activity, arrival times and properties of future subtasks, etc). The scheduler is aware that these values are not 100% accurate and they are not safe enough. It still relies on upper bounds to guarantee all hard constraints. These estimates are used to optimize the knob settings for the expected reality, in contrast to the statistical optimization and optimizing for the worst-case or average case. The better the accuracy of these predictions the better the gains. In one embodiment, highly optimized and adaptive application-, context-, and content-specific predictors are used for better accuracy at low overhead. E.g., one embodiment envisages a predictor which is specialized for video by exploiting the meta-data available in the content headers and the correlations of moving objects across frames. In this example, for the results shown below, a simple predictor (sm4) is used: for each scenario (see section C. above) it maintains the actual execution cycles of 4 recent macroblocks and returns maximum of these as the estimated value. Prediction is only needed for those scenarios where the upper bounds are not too tight.

F. Play-forward Slack Management

In the sections above, various features have been discussed which will affect the overall optimization quality. The crux lies at the best use of all these bits and pieces for effective slack allocation to result in optimal knob settings. Propagating and evaluating the effect of knob decisions of earlier subtasks on knob decisions of future subtasks to avoid sub-optimal future is the key—this is called the play-forward technique. Excessive slack usage by some subtasks so that future subtasks do not have enough slack especially to ensure the timing constraint with the desirable mode even when expected amount of slack is released and hence forced to switch to costlier mode is the least addressed by the existing techniques (c.f.r. subtasks 4,5,6,7 in 1pLDAT_UBR_SW8 row, which uses slack allocation policy as in [6] and upper bound refinement described above). This is incorporated in proactive energy performance scaling model using the play-forward constraints: every subtask will finish before its deadline with the expected mode even when it requires upper bound execution cycles but all the previous subtasks take no more than their expected duration. Ideally, the scheduler needs to extract all the slack from both the past and the future and should allocate in right proportion where it is needed for meeting constraints or more beneficial from cost point of view. One embodiment advocates techniques which identify the right amount of slack required by the current subtask and extracting it from the right place, to limit the overhead.

Figure 9:
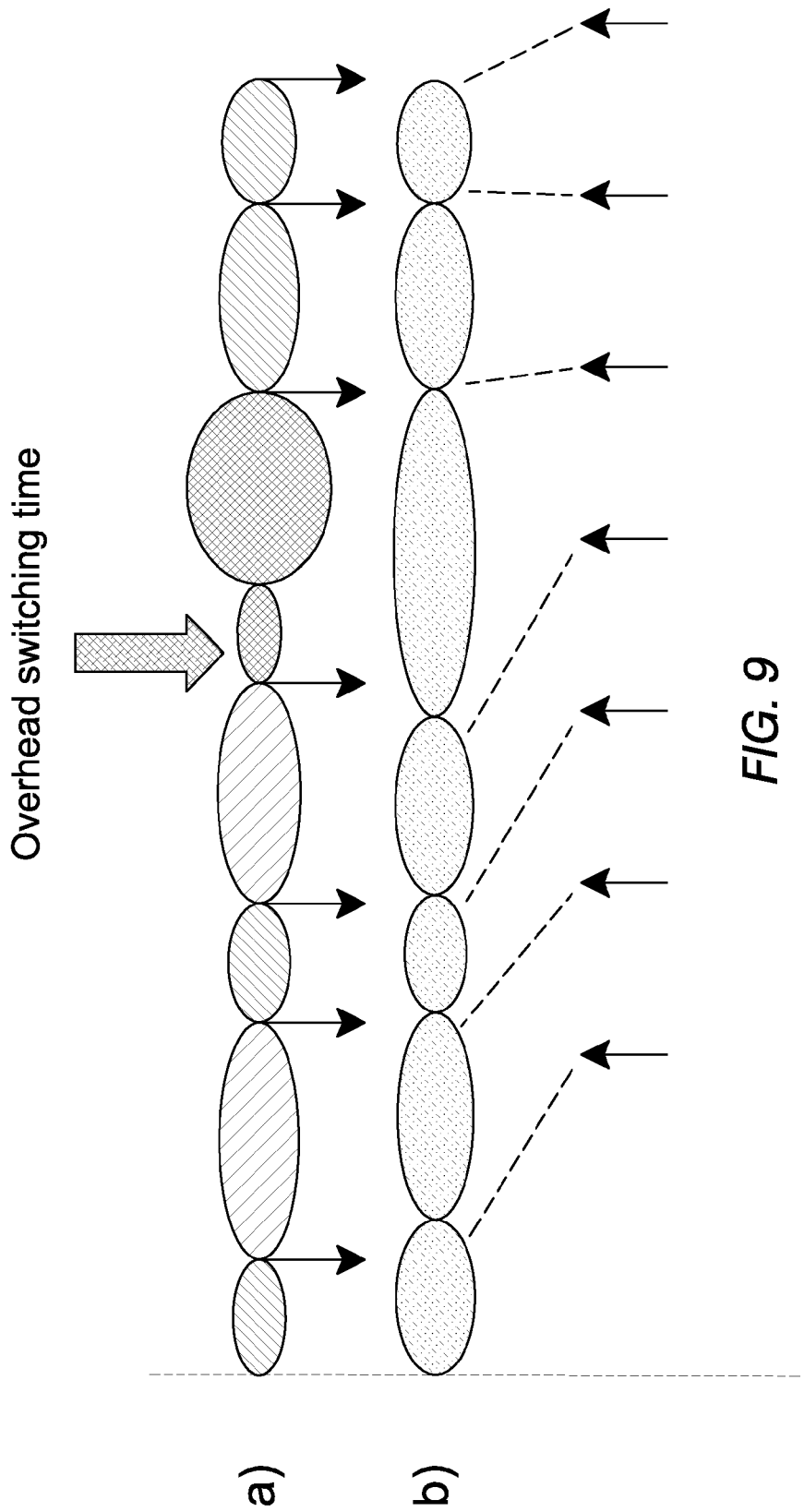
FIG. 9 illustrates (a) actual task timeline (b) estimated task timeline. The bottom timeline shows the schedule prepared at the beginning of the task with estimated execution cycles. As the schedule is executed, as shown in upper part of the figure, second sub-task took slightly longer but still within the time expected by the scheduler due to the slack from the first sub-task. But the fourth sub-task took longer than expected and beyond its expected end time, which triggers the controller and potentially forces to run one or more of the following sub-tasks at higher speeds. The small black oval shows the extra switching overhead and the big black oval is the sub-task which has to be run at higher power knob setting to meet the deadline.

With reference to FIG. 9, in embodiments of the present invention, while utilizing estimates, the scheduler takes controlled risk of allocating less time budget to a subtask than the subtask might actually utilize in worst-case while still guaranteeing the deadlines of both current and future subtasks. By doing so the controller speculatively runs the subtasks at slower modes (c.f.r. subtasks 1-3 in FSS_UBR_SW2/4 rows, compared to SR_UBR_SW4) which will be optimal when estimates are correct. FSS_UBR_SW4 shows what happens when the estimates are incorrect. The simple, same as previous, estimator in this experiment predicted very low actual execution cycles for subtasks 4-6 and as a result the scheduler switched to M3 for subtask-4. In reality subtask-4 took much longer than predictor indicated and as a result the scheduler is forced to switch to M1 to ensure the deadlines of subtasks 5-7. The fact that the system has enough processing power to handle the worst-case situation and that the system is trying to run at slower but energy efficient modes, indicates that there is some room. Note the future slack stealing gains even in the absence of dynamic upper bound refinement (c.f.r. FSS_noUBR_SW4 vs. SR_noUBR_SW1/4).

G. Context-specific Dynamic Procedure

In embodiments of the present invention, to reduce the overall time and energy overhead (of the "ctrl" component in FIG. 1(*b*)) for solving this optimization problem at run-time, a highly customized dynamic procedure is used. The main idea is that the complex optimization with large horizon does not always need to be solved; even smaller values gives decent, sometimes even better (due to finite horizon deceptiveness typical of uncertain optimization), result, without negative future consequences, in some cases (for subtasks 1-15 in FSS_UBR_SW2 is good enough but SW4 is needed at subtask-16). If the system switches between methods of different complexities at the right moment in time, the average run-time overhead of the optimization can significantly be reduced without noticeable sub-optimality.

Typical scheduling algorithms are today implemented as a static procedure, i.e., it performs same computation each time it is invoked, in other words it is stateless. The reason is that they are not meant for receding horizon optimization and assume that each time they might get entirely different subtasks to schedule. In contrast, to exploit the inherent incremental nature of proactive energy performance scaling, the procedures used are enhanced with state, to reduce their average complexity, by remembering and reusing the computations across repeated invocations of the same procedure (see section B. above). A complexity model is associated with the procedure which indicates when it would take more computations, e.g. at the initialization or when some of the data (like estimates) used in previous invocation changed significantly. A procedure is always "safe", i.e., it ensures that all the constraints of subtasks are met with the modes recommended by it. The quality of a given procedure is defined as the energy gains (of the system being controlled) achieved by applying this procedure. It is important to note that the quality of a procedure is dynamic, i.e., under certain conditions the quality is very high but poorer in other cases, and hence a quality model is maintained. The complexity and quality models (typically look-up tables based on generic scenarios concept) will be used at run-time to evaluate a given procedure for the dynamic scheduling instance at hand. Multiple such procedures are maintained, each with different quality-complexity tradeoffs. A dynamic procedure is the one which uses different state-enhanced procedures at different time instances which are selected based on the quality-complexity trade-offs for the given dynamic scheduling instance at hand, within the time available for the knob decision making.

Illustrative Implementation

Figure 7:
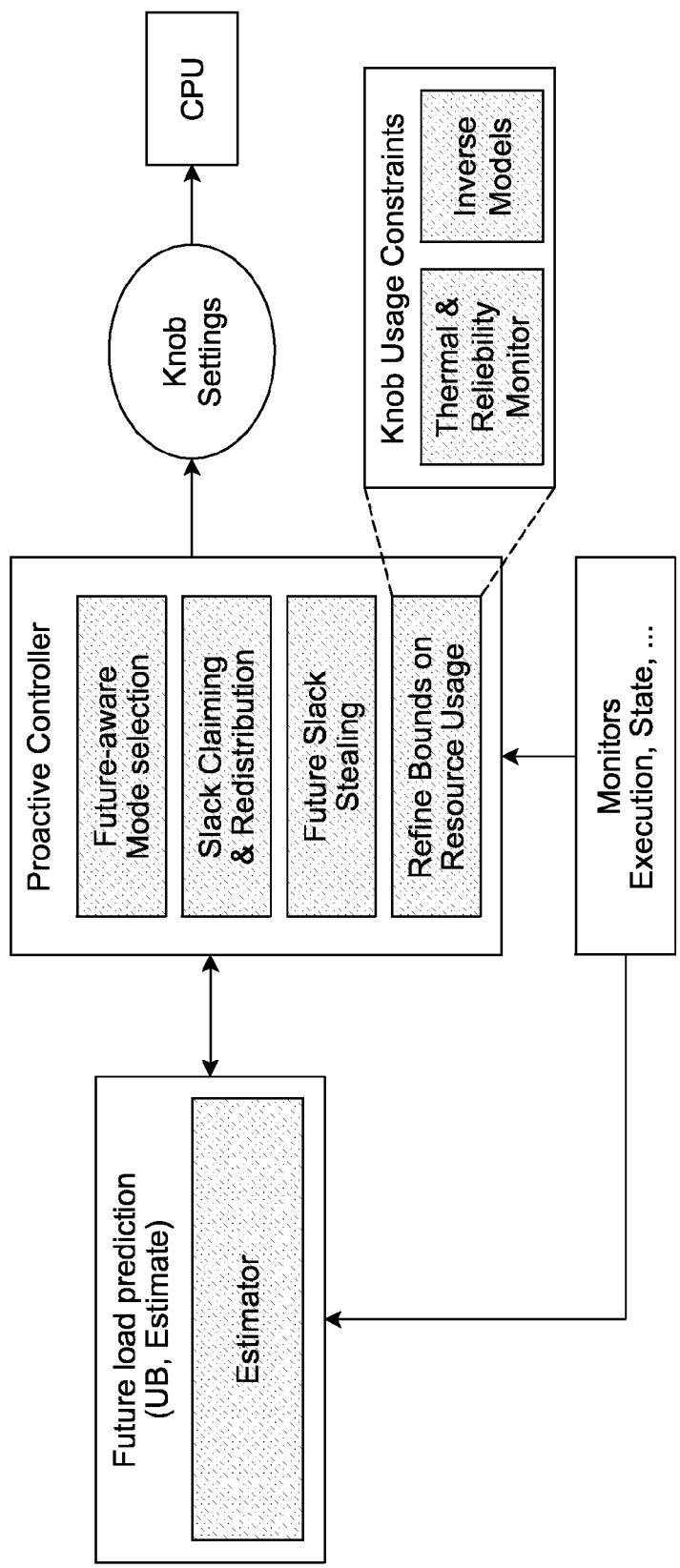
FIG. 7 is a diagram illustrating overview of certain embodiments.
Figure 8:
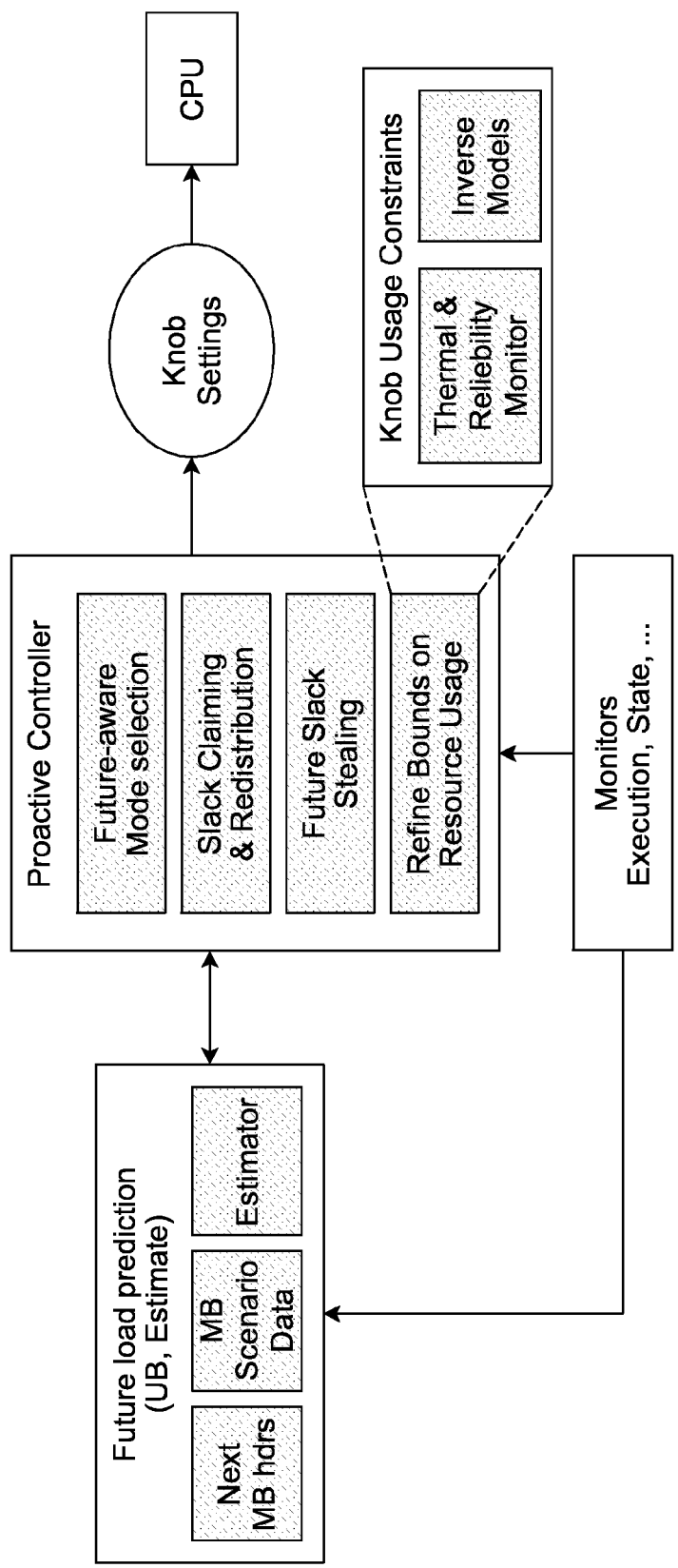
FIG. 8 is a diagram illustrating overview of certain embodiments of a video decoder system.

As shown in FIG. 2 and FIGS. 7 and 8 an implementation of one embodiment includes a processor or central processing unit (CPU) which may be a microprocessor, an ASIC, a programmable field array such as an FPGA or similar processing engine. The processor may be embedded. The processor may include a controller or the controller may be a separate item in communication with the processor. The controller may be implemented as a software algorithm running on the processor or may be implemented as a microprocessor, a microcontroller, an ASIC, a programmable field array such as an FPGA or similar processing engine. The processor and the controller manage the operation of a hard real time electronic digital system, by exploiting task information determined by a predictor. Also a memory is provided such as a DRAM.

When a new task is received by the processor, then for a set of tasks to be run on the electronic system including a new task, the controller is adapted to select a current working mode for the set of tasks for executing the tasks from a set of working modes based on upper bound information of the tasks and a condition for revising a working mode of the system.

The controller is adapted to run a dynamical procedure that outputs an improved working mode for the tasks from the set of working modes and one or more conditions for revising the working mode, depending on overhead and constraints information of at least one completed task and at least one to be completed task determined by the predictor. The output can be provided to the processor.

The above procedure is part of a refinement procedure. The controller or the processor are adapted to implement the current working mode of the improved working mode of tasks on the system depending on the one or more conditions for revising the working mode.

The system may include a predictor, and the controller and/or the predictor may be adapted to determine the upper bound of the tasks:
  loading the upper bound information of the tasks available at design time; and
  determining a refined upper bound of the tasks using a model developed at design time using constraints information of the tasks determined by the predictor;

The controller can be adapted to carry out the re-optimization procedure that outputs the improved working mode or modes for the tasks, based on the amount of slack of the tasks. The controller and/or the predictor can determine the amount of slack of the tasks depending on:
  slack usage of future tasks by assigning more slack to a task in anticipation of the equivalent amount of slack being released by future tasks; and
  slack usage of the past and finished task by assigning the released slack to future tasks.

The controller can be adapted to select a working mode at run-time using an energy/execution-time look-up table of the electronic system determined at design-time. The look-up table is preferably stored in memory that is accessible by the controller and/or the processor. The look-up table preferably contain an extreme working mode which the controller can select at run-time depending on timing, thermal and reliability constraints of the system using pre-defined models at design time.

The controller and/or the predictor can be adapted to determine overhead and constraints information by using optimized and adaptive application-, context-, and content-specific predictors for better accuracy at low overhead.

The controller can be adapted to use dynamically state-enhanced procedures at different time instances which are selected based on a quality-complexity trade-off.

One embodiment also includes a computer program product that when executed on a processing engine manages the operation of a hard real time electronic digital system, by exploiting task information determined by a predictor.

The computer program product includes software that is adapted such that when a new task is received by the processor, then for a set of tasks to be run on the electronic system including a new task, a current working mode for the set of tasks is selected for executing the tasks from a set of working modes based on upper bound information of the tasks and a condition for revising a working mode of the system.

The software can be adapted to run a dynamical procedure that outputs an improved working mode for the tasks from the set of working modes and one or more conditions for revising the working mode, depending on overhead and constraints information of at least one completed task and at least one to be completed task determined by the predictor. The output can be provided to the processor.

The above procedure is part of a refinement procedure. The software can be adapted to implement the current working mode of the improved working mode of tasks on the system depending on the one or more conditions for revising the working mode.

The system may include a predictor, and the software may be adapted to determine the upper bound of the tasks:
  loading the upper bound information of the tasks available at design time; and
  determining a refined upper bound of the tasks using a model developed at design time using constraints information of the tasks determined by the predictor;

The software can be adapted to carry out the re-optimization procedure that outputs the improved working mode or modes for the tasks, based on the amount of slack of the tasks. The software can determine the amount of slack of the tasks depending on:
  slack usage of future tasks by assigning more slack to a task in anticipation of the equivalent amount of slack being released by future tasks; and
  slack usage of the past and finished task by assigning the released slack to future tasks.

The software can be adapted to select a working mode at run-time using an energy/execution-time look-up table of the electronic system determined at design-time. The look-up table is preferably stored in memory that is accessible by the computer program product. The look-up table preferably contains an extreme working mode which the software can select at run-time depending on timing, thermal and reliability constraints of the system using pre-defined models at design time.

The software can be adapted to determine overhead and constraints information by using optimized and adaptive application-, context-, and content-specific predictors for better accuracy at low overhead.

Figure 3:
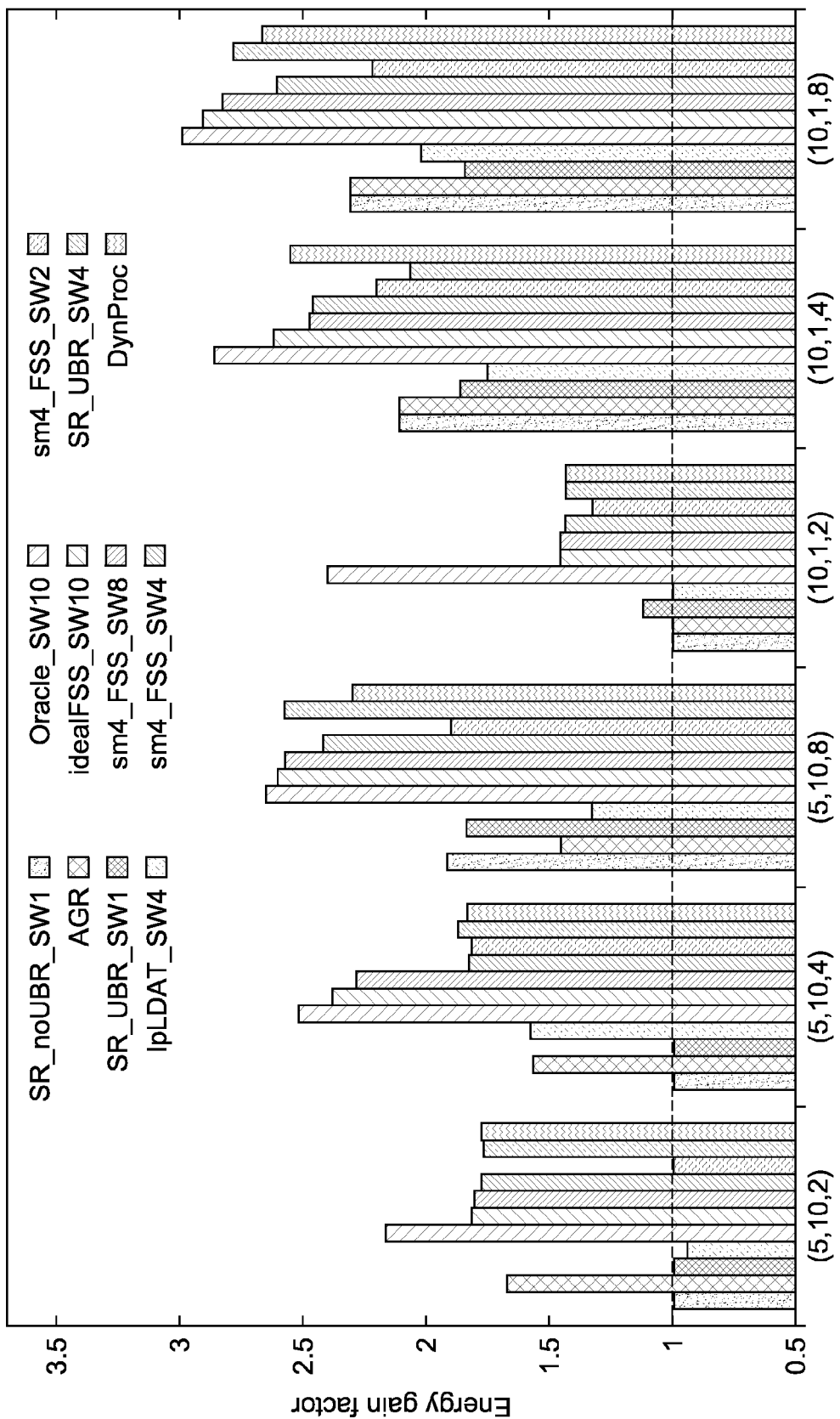
FIG. 3 is a diagram illustrating energy gains of various proposed proactive energy performance scaling techniques and the existing ones for different design configurations (switching time overhead in us, switching energy overhead in uJ, output buffer size)

The software can be adapted to use dynamically state-enhanced procedures at different time instances which are selected based on a quality-complexity trade-off Experimental Results FIG. 3 shows the comparison between various fine-grain scheduling techniques for the Reconstruct module of FIG. 1(b). For statistically significant conclusions, the energy consumption data is averaged over scheduling of large number of macroblocks: 2 sec of video in each of four different 720p video sequences (crew, crowd, jets, city). All the gains are shown as a factor with respect to NoKnobs case, which consumes an average power of 450 mw. The Oracle SW10 bar shows the theoretical gains which is the target to reach. The bars left of the Oracle (theoretical best performance) are the existing techniques and to the right are the techniques of the proposed framework in accordance with embodiments of the present invention. Existing techniques like SR_UBR_SW1 [7], 1pLDAT[6], AGR[10] are often poorer than straightforward reactive technique SR_noUBR_SW1. The gains with a practical predictor (sm4) are very close to the gains with the non-realizable ideal predictor (sm4_FSS_SW8 vs. idealFSS_SW10) and not very far from the Oracle. Thus it shows that embodiments of the present invention which provide upper bound refinement, future slack stealing, and play-forward are enabling a near-optimal desirable solution. * SW# uses an optimal solver to keep away the interferences from practical but sub-optimal heuristics. When the SW is very small, an exact optimal solution is also practical with acceptable overhead. To illustrate the feasibility of the dynamic procedure concept of embodiments of the present invention, one simple dynamic procedure is implemented (pseudo code is not shown here due to space limitations), which is called DynProc. DynProc switches between four procedures sm4FSS_UBR_SW2/4 and SR_UBR_SW1/4. The implemented procedures for * _SW2 are exact solutions where as for * _SW4 incorporate typical dynamic-voltage scaling-like heuristics such as trying to find a single common mode with a switching only at the beginning or two adjacent modes with an additional switching in between. Each of these have been enhanced to reuse maximum computations across invocations and implemented with couple of predicates or gating conditions before major pieces of computations inside the procedure. When the upper bounds of subtasks optimized together are tight, optimization is not re-invoked for every subtask. The % gap between upper bounds and expected execution cycles of subtasks is used as the threshold for switching decisions between sm4FSS_UBR_SW2/4. The current output buffer size is used as threshold to determine when to use SR_UBR_SW1/4. DynProc in FIG. 3 shows the gains with this practical technique. Although content-specific criteria have not been used in DynProc, it is possible to use content-specific criteria such as use of specific methods for macroblocks of static regions, high motion regions, edges, etc. It is reemphasized that these criteria only affect the resulting optimization quality, i.e. energy gains, but not the constraints as every procedure is designed to result in safe schedules.

This analysis indicates that a heavily optimized implementation of DynProc requires about 10 k 16 b equivalent operations per invocation, which is about 900 MOPS in this example. Recent literature indicates that one can design an ultra low-power specialized ASIP which can deliver at least 100 MOPS/mw in 65 nm technology. As shown in FIG. 3 DynProc results in more than 2× energy gains, i.e., it saves more than 200 mw, where as it requires <10 mw. Thus the overhead of the proposed practical DynProc proactive scheduler is <5%.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

References

[1] M. Bekooij et. al., "Predictable embedded multiprocessor system design," in In Proc. SCOPES. Springer, 2004.
[2] P. A. N. Bosman, "Learning, anticipation and time-deception in evolutionary online dynamic optimization," in GECCO '05.
[3] A. A. Jalali and V. Nadimi, "A survey on robust model predictive control from 1999-2006," Computational Intelligence for Modelling, Control and Automation, International Conference on, vol. 0, p. 207, 2006.
[4] A. Andrei et. al., "Quasi-static voltage scaling for energy minimization with time constraints," in DATE '05.
[5] H. Aydin, R. Melhem, D. Moss, and P. Meja-Alvarez, "Power-aware scheduling for periodic real-time tasks," IEEE Transactions on Computers, vol. 53, no. 5, pp. 584-600, 2004.
[6] B. Mochocki et. al., "Transition-overhead-aware voltage scheduling for fixed-priority real-time systems," ACM TODAES, vol. 12, no. 2, 2007.
[7] S. V. Gheorghita et. al., "System scenario based design of dynamic embedded systems," TODAES, 2008.
[8] "Gecode: Generic constraint development environment."
[9] A. Maxiaguine et. al., "Dvs for buffer-constrained architectures with predictable qos-energy tradeoffs," in CODES+ISSS '05.
[10] P. Pillai and K. G. Shin, "Real-time dynamic voltage scaling for lowpower embedded operating systems," in SOSP '01: Proceedings of the eighteenth ACM symposium on Operating systems principles.
[11] Lap-Fai Leung et. al., "Exploiting dynamic workload variation in low energy preemptive task scheduling," in DATE '05.

What is claimed is:

1. A method of managing the operation of a hard real time electronic system, using a processor configured to receive a task partitioned into a set of sub-tasks, by exploiting task information determined by a predictor, the method comprising:
when a new sub-task is received by the processor, selecting at run-time a current working mode from a set of working modes for a set of sub-tasks comprising the new sub-task and a condition for revising a working mode of the hard, real time electronic system, the current working mode selected using an energy versus execution-time look-up table defining the set of working modes for each new sub-task individually, the set of working modes determined for the individual new sub-task, the current working mode being used for executing the set of sub-tasks based on upper bound information of the set of sub-tasks;
running a dynamical procedure which selects an improved working mode for the set of sub-tasks from the set of working modes and the condition for revising the working mode of the hard real time electronic system, depending on overhead and constraints condition information of at least one completed sub-task and at least one to be completed sub-task determined by the predictor; and implementing the current working mode or the improved working mode for the set of sub-tasks on the hard real time electronic system in response to proactive evaluation of consequences of implementing the current working mode or the improved working mode by creating a history of future implications and depending on the condition for revising the working mode of the hard real time electronic system.

2. The method of claim 1, wherein an upper bound of the set of sub-tasks is determined by:
   loading the upper bound information of the set of sub-tasks available at design time; and
   determining a refined upper bound of the set of sub-tasks using a model developed at design time using constraints information of the set of sub-tasks determined by the predictor.

3. The method of claim 1, wherein the dynamical procedure is performed based on an amount of slack of the set of sub-tasks.

4. The method of claim 3, wherein the amount of slack of the set of sub-tasks is determined depending on:
   slack usage of future sub-tasks by assigning more slack to a sub-task in anticipation of an equivalent amount of slack being released by future sub-tasks; and
   slack usage of past and finished sub-tasks by assigning the released slack to future sub-tasks.

5. The method of claim 1, wherein the process of selecting one mode as a current working mode is done at run-time using the energy versus execution-time look-up table of the hard real time electronic system determined at design-time.

6. The method of claim 5, where the look-up table comprises an extreme working mode which can be selected at run-time depending on timing, thermal and reliability constraints of the hard real time electronic system using pre-defined models at design time.

7. The method of claim 1, wherein overhead and constraints information of sub-tasks are determined by using optimized and adaptive application-specific predictors, context-specific predictors, and content-specific predictors.

8. The method of claim 1, wherein dynamically state-enhanced procedures are used at different time instances which are selected based on a quality-complexity trade-off.

9. A non-transitory computer-readable medium having stored thereon instructions which, when performed by a processor, performs the method of managing the operation of a hard real time electronic system of claim 1.

10. A hard real time system comprising:
    a processor configured to receive a task partitioned into a set of sub-tasks;
    a selection module configured to, when a new sub-task is received by the processor, select at run-time a current working mode from a set of working modes for executing a set of sub-tasks comprising the new sub-task based on upper bound information of the set of sub-tasks and a condition for revising a working mode of the hard real time system, the current working mode selected using an energy versus execution-time look-up table defining the set of working modes for each new sub-task individually, the set of working modes determined for the individual new sub-task;
    a revision module configured to run a dynamical procedure that outputs an improved working mode for the set of sub-tasks from the set of working modes and the condition for revising the working mode of the hard real time system, depending on overhead and constraints condition information of at least one completed sub-task and at least one to be completed sub-task determined by a predictor;
    an implementation module configured to implement the current working mode or the improved working mode for the set of sub-tasks on the hard real time system in response to proactive evaluation of consequences of implementing the current working mode or the improved working mode by creating a history of future implications and depending on the condition for revising the working mode of the hard real time system; and
    a controller configured to execute the modules.

11. A controller for controlling the operation of a hard real time system by exploiting task information determined by a predictor, the controller comprising:
    a selection module configured to, when a new sub-task is received by a processor configured to receive a task partitioned into a set of sub-tasks, select at run-time a current working mode from a set of working modes for executing a set of sub-tasks comprising the new sub-task based on upper bound information of the set of sub-tasks and a condition for revising a working mode of the hard real time system, the current working mode selected using an energy versus execution-time look-up table defining the set of working modes for each new sub-task individually, the set of working modes determined for the individual new sub-task;
    a revision module configured to run a dynamical procedure that outputs an improved working mode for the set of sub-tasks from the set of working modes and the condition for revising the working mode of the hard real time system, depending on overhead and constraints condition information of at least one completed sub-task and at least one to be completed sub-task determined by the predictor;
    an implementation module configured to implement the current working mode or the improved working mode for the set of sub-tasks on the hard real time system in response to proactive evaluation of consequences of implementing the current working mode or the improved working mode by creating a history of future implications and depending on the condition for revising the working mode of the hard real time system; and
    a computing environment operative to execute the modules, the computing environment comprising at least one processor.

12. The controller of claim 11, wherein the controller is configured to carry out the dynamical procedure that outputs the improved working mode or modes for the set of sub-tasks, based on an amount of slack of the set of sub-tasks.

13. The controller of claim 12, wherein the amount of slack of the set of sub-tasks is determined depending on:
    slack usage of future sub-tasks by assigning more slack to a sub-task in anticipation of an equivalent amount of slack being released by future sub-tasks; and
    slack usage of past and finished sub-tasks by assigning the released slack to future sub-tasks.

14. The controller of claim 11, wherein the controller is configured to select a current working mode at run-time using the energy versus execution-time look-up table of the hard real time system determined at design-time.

15. The controller of claim 14, wherein the look-up table is stored in a memory that is accessible by the controller.

16. The controller of claim 15, wherein the look-up table comprises an extreme working mode, and the controller is configured to select at run-time the extreme working mode depending on timing, thermal and reliability constraints of the hard real time system using pre-defined models at design time.

17. The controller of claim 11, wherein the controller is configured to use dynamically state-enhanced procedures at different time instances which are selected based on a quality-complexity trade-off.

18. The controller of claim 11, wherein overhead and constraints information of sub-tasks are determined by using optimized and adaptive application-specific predictors, context-specific predictors, and content-specific predictors.

19. An apparatus for managing the operation of a hard real time electronic system, using a processor configured to receive a task partitioned into a set of sub-tasks, by exploiting task information determined by a predictor, the apparatus comprising:

means for, when a new sub-task is received by the processor, selecting at run-time a current working mode from a set of working modes for a set of sub-tasks comprising the new sub-task and a condition for revising a working mode of the hard real time electronic system, the current working mode being used for executing the set of sub-tasks based on upper bound information of the set of sub-tasks, the current working mode selected using an energy versus execution-time look-up table defining the set of working modes for each new sub-task individually, the set of working modes determined for the individual new sub-task;

means for running a dynamical procedure which selects an improved working mode for the set of sub-tasks from the set of working modes and the condition for revising the working mode of the hard real time electronic system, depending on overhead and constraints condition information of at least one completed sub-task and at least one to be completed sub-task determined by the predictor; and means for implementing the current working mode or the improved working mode for the set of sub-tasks on the hard real time electronic system in response to proactive evaluation of consequences of implementing the current working mode or the improved working mode by creating a history of future implications and depending on the condition for revising the working mode of the hard real time electronic system.

* * * * *